United States Patent
Niemann et al.

(10) Patent No.: US 6,689,988 B2
(45) Date of Patent: Feb. 10, 2004

(54) WELDING GUN HAVING A PLATED TIP AND METHOD FOR MAKING SAME

(75) Inventors: Douglas J. Niemann, Florence, SD (US); Robert W. Wakeman, Watertown, SD (US)

(73) Assignee: Illinois Tool Works Inc., Glenview, IL (US)

( * ) Notice: Subject to any disclaimer, the term of this patent is extended or adjusted under 35 U.S.C. 154(b) by 113 days.

(21) Appl. No.: 09/967,015

(22) Filed: Sep. 28, 2001

(65) Prior Publication Data

US 2003/0062353 A1 Apr. 3, 2003

(51) Int. Cl.[7] .................................................. B23K 9/28
(52) U.S. Cl. .............................. 219/137.61; 219/137.43
(58) Field of Search ......................... 219/137.61, 137.43

(56) References Cited

U.S. PATENT DOCUMENTS

| | | | | |
|---|---|---|---|---|
| 4,733,052 A | * | 3/1988 | Nilsson et al. | 219/137.61 |
| 4,766,349 A | * | 8/1988 | Johansson et al. | 313/631 |
| 4,904,843 A | * | 2/1990 | Hori et al. | 219/137 PS |
| 4,947,024 A | * | 8/1990 | Anderson | 219/137.61 |
| 5,205,469 A | * | 4/1993 | Capitanescu | 228/225 |
| 6,093,907 A | | 7/2000 | Hidaka | 219/137.61 |

* cited by examiner

*Primary Examiner*—M. Alexandra Elve
*Assistant Examiner*—Kevin McHenry
(74) *Attorney, Agent, or Firm*—Fletcher Yoder

(57) ABSTRACT

An arc welding system using a wire to produce an arc. The arc welding system comprising a welding handle. A tip being disposed in the welding handle to direct wire through the welding handle. The tip having a passage through the tip to receive the wire. The tip having an end portion adapted to be in facing relationship with a target material during welding. The passage having an outer surface layer of electroless nickel. The end portion having an outer surface layer of electrolytic nickel.

43 Claims, 5 Drawing Sheets

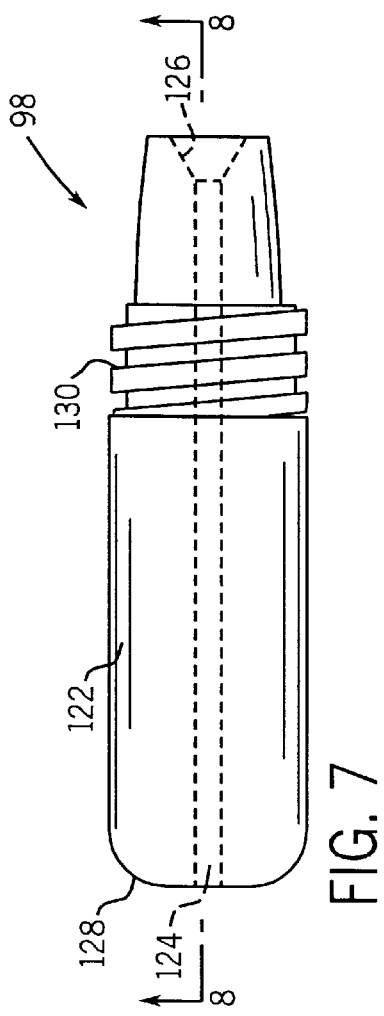
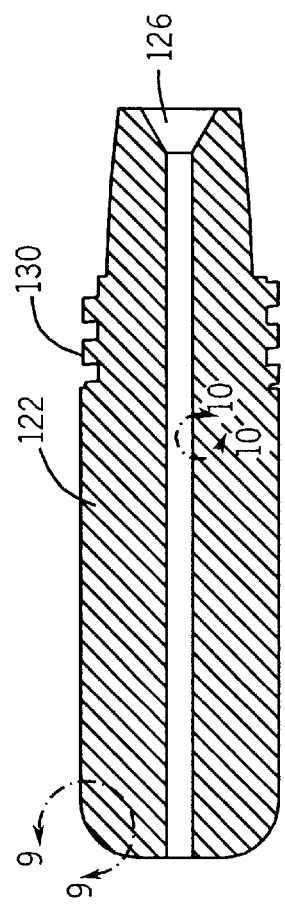
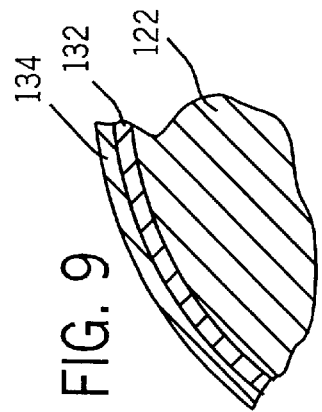
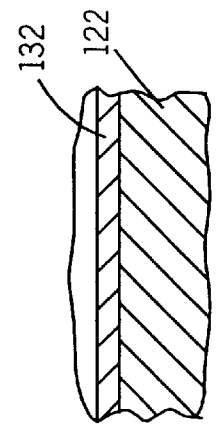

WELDING GUN HAVING A PLATED TIP AND METHOD FOR MAKING SAME

FIELD OF THE INVENTION

The present invention relates generally to welding systems, and particularly to a wire-feed welding gun having a tip to guide wire through the welding gun.

BACKGROUND OF THE INVENTION

Welding is a method of joining pieces of metal together into one solid piece. Welding guns are used in a number of different types of welding. For example, welding guns are typically used in arc welding. An arc welding system typically comprises an electric power supply coupled to a welding gun that houses an electrode. The electric power supply typically includes a conductive cable and a clamp for securing the conductive cable to the metal piece to be welded. The electrode in the welding handle, along with the metal piece and conductive cable, completes an electrical circuit with the power supply when the electrode is placed against the metal piece. The contact between the electrode and the metal piece produces an electric arc between the electrode and the metal piece. The heat of the electric arc is concentrated on the metal piece, or pieces, to be joined. The heat of the arc melts the metal piece, or pieces. A filler material is added to the molten metal. The molten mass then cools and solidifies, joining the metal pieces.

MIG (Metal Inert Gas) welding is one type of arc welding. MIG welding is also referred to as "wire-feed" or GMAW (Gas Metal Arc Welding). In MIG welding, a metal wire is used as the electrode to produce the arc. The wire is shielded by an inert gas and the metal wire acts as the filler for the weld. The inert gas is used to shield the electric arc from outside contaminants and gases that may react with the weld. Non-inert gases, such as $CO_2$, also are used in MIG welding.

Typically, the wire and gas are fed through a hand-held welding gun. The wire and gas are fed to the welding gun from a wire feeder. The wire feeder is, in turn, coupled to a power source and a source of gas, such as a gas cylinder. The wire is directed to a workpiece through a tip in the welding gun. The welding gun, typically, has a switch, or trigger, that is coupled to the wire feeder. When the trigger is operated, gas and wire are fed through the tip towards the target.

Submerged arc welding is another type of arc welding. In submerged arc welding, a granular flux, rather than a gas, is used. The flux is fed through a wire feeder, along with electricity from the power source. The wire is used to complete an electrical circuit and creates an arc to melt the object metal. In submerged arc welding, the actual point of metal fusion and the arc are submerged within the flux. The flux is a granular composition of chemical and metallic materials that shields the arc. The granular flux is continuously deposited just ahead of the electrode. The electrical current melts the electrode to form the weld puddle. The portion of the flux that is adjacent to the electrode tip and the puddle melts, forming a slag layer that refines the weld and excludes air. As in MIG welding, the wire is fed through a tip within the welding gun. The welding gun, typically, has a switch, or trigger, that is coupled to the wire feeder. When the trigger is operated, the flux and wire are fed through the tip towards the target.

For many years, the tips for MIG and SMAW welding guns have been made from copper, or a copper alloy. Copper and copper alloys are very good at conducting electrical current and heat. They also have a fair resistance to wear characteristics. The alloys of copper tend to enhance the wear characteristics but very often are difficult to machine and are relatively expensive. In addition, the drawing process to produce the bar stock from which the tips are made tends to leave an irregular finish on the interior diameter of the tip, which can enhance wear of the tip as the wire feeds through. Furthermore, the welding gun produces a significant amount of weld spatter (small droplets of molten metal) that tends to adhere to the face of the tip, building up a deposit of weld spatter on the face of the tip. Eventually, the weld spatter breaks away, taking a piece of the tip with it, thereby eroding the tip.

There exists then a need for a welding gun that has an improved tip that will prevent, or minimize, the buildup of weld spatter on the tip. Furthermore, there is a need for an improved method of making a tip to improve the ability of the tip to withstand wear.

SUMMARY OF THE INVENTION

The present technique may solve one or more of the problems outlined above. According to one aspect of the present technique, a novel wire-feed welding system is featured. The welding system features an electrical power source, a wire feeder having a wire electrically coupleable to the electrical power source; and a welding gun adapted to receive the wire from the wire feeder. The welding gun has a tip to guide the wire through the welding gun. The tip has a body and a passage through the body. The body has an outer surface layer of electrolytic nickel and the passage has an outer surface layer of electroless nickel.

According to another aspect of the present technique, a tip for a wire-feed welding system is featured. The tip has a first surface layer disposed over a first portion of the tip. The first surface layer comprises electrolytic nickel. The tip also has a second surface layer disposed over a second portion of the tip. The second surface layer comprises electroless nickel.

According to yet another aspect of the present technique, a method for adapting a tip for use with a welding gun is featured. The method comprises the act of applying a first layer of nickel to the tip in an electroless process. The method also comprises the act of subsequently applying a second layer of nickel to the tip in an electrolytic process.

According to still yet another technique, a method for assembling a wire-feed welding gun is featured. The method comprises the act of adapting a tip to have a passageway extending through the tip. The method also comprises the act of applying a first layer of electroless nickel to the tip. The method further comprises the act of subsequently applying a second layer of electrolytic nickel to the tip. The method also comprises assembling the welding gun with the tip.

BRIEF DESCRIPTION OF THE DRAWINGS

The invention will hereafter be described with reference to the accompanying drawings, wherein like reference numerals denote like elements, and:

FIG. 7 is a front elevational view of a tip, according to an exemplary embodiment of the present technique;

FIG. 8 is a cross-sectional view of the tip, taken generally along line 8—8 of FIG. 7;

FIG. 9 is a detailed cross-sectional view of an outer surface of the tip, taken generally along line 9—9 of FIG. 8; and FIG. 10 is a detailed cross-sectional view of an inner surface of the tip, taken generally along line 10—10 of FIG. 8.

DETAILED DESCRIPTION OF THE PREFERRED EMBODIMENTS

Figure 1:
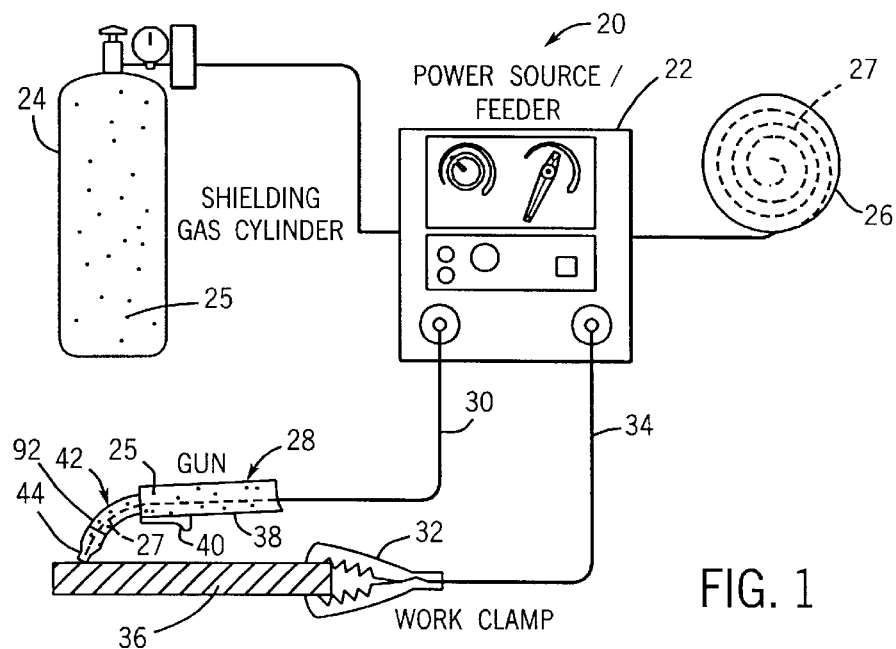
FIG. 1 is a diagram of a MIG welding system, according to an exemplary embodiment of the present technique.

Referring generally to FIG. 1, an exemplary metal inert gas ("MIG") welding system 20 is illustrated. The illustrated MIG welding system 20 comprises a power source/feeder 22, a gas cylinder 24 containing a gas 25 that is coupled to the power source/feeder 22, a spool 26 of electrode wire 27 that is coupled to the power source/feeder, a MIG welding gun 28, a MIG welding cable 30, a work clamp 32, and a ground cable 34. The power source/feeder 22 is a source of electric power. Additionally, the power source/feeder 22 directs the feeding of gas 25 and wire 27 to the MIG welding cable 30. The MIG welding cable 30 is operable to route the gas 25 and the wire 27 to the welding gun 28. The work clamp 32 is clamped onto the conductive target material 36 to be welded. The work clamp 32 and a ground cable 34 electrically couple the power source/feeder 22 to the target material 36. Additionally, the wire 27 within the MIG welding cable 30 is electrically coupled to the power source/feeder 22.

The welding gun 28 is used to direct the wire to the target material 36 and to control the supply of gas 25 and wire from the power source/feeder 22 to the target 36. When the wire is touched to the target material 36, the electrical circuit is completed. Electricity from the power source 22 flows through the wire 27 and target material 36, producing an arc. The electric arc produces heat that melts the target material 36 in a region surrounding the point of contact between the wire 27 and the target material 36. The wire also acts as filler material. The heat of the arc melts the wire 27 along with the target material 36. The inert gas 25 forms a shield that prevents harmful chemical reactions from occurring at the weld site. When the arc is removed, the target material and the filler material solidify, forming the weld.

The welding gun 28 comprises a handle 38, a trigger 40, and a neck assembly 42. The MIG welding cable 30 also has an electrical cable (not shown) that is electrically coupleable to the trigger 40. The trigger 40 enables a user to control the supply of gas 25, wire 27 and power from the power source/feeder 22. A number of events occur when the trigger 40 is operated. One event is that the power source/feeder 22 draws in wire 27 from the wire spool 26 and feeds it though the MIG welding cable 30 to the welding gun 28. Additionally, gas 25 from the gas cylinder 24 flows through the MIG welding cable 30 to the welding gun 28. Also, electric power from the power source/feeder 22 is supplied to the wire 27. The wire 27 and gas 25 are then fed through the neck assembly 42 towards the target material 36. The neck assembly 42 has a nozzle 44 that directs the wire 27 and gas 25 towards the target 36. When the trigger 40 is released, gas 25, wire 27, and electrical power are no longer fed to the welding gun 28.

Figure 2:
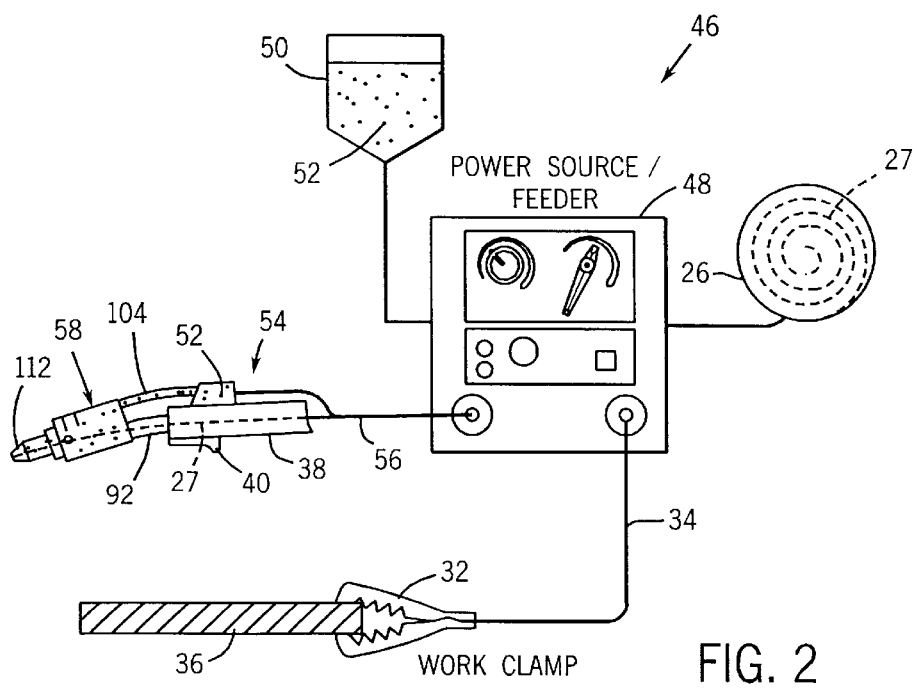
FIG. 2 is a diagram of a submerged arc welding system, according to an exemplary embodiment of the present technique.

Referring generally to FIG. 2, an exemplary submerged arc welding ("SMAW") system 46 is illustrated. The illustrated SMAW system 46 comprises a power source/feeder 48, a flux reservoir 50 containing flux 52, a wire spool 26, a SMAW welding gun 54, a SMAW welding cable 56, a work clamp 32, and a ground cable 34. In the illustrated embodiment, the flux reservoir 50 is used to supply a powdered flux to the power source/feeder 48. As above, the wire spool 26 is used to supply wire 27 to the power source/feeder 48. The power source/feeder 48 receives the flux 52 and wire 27 from the flux reservoir 50 and wire spool 26, respectively, and feeds them to the SMAW welding gun assembly 54 through the welding cable 56. The SMAW welding cable 56 is operable to supply flux 52, from the power source/feeder to the welding gun 54. As above, the work clamp 32 is clamped onto a conductive target material 36 to electrically couple the power source/feeder 48 to the target material 36.

The SMAW welding gun 54 is used to direct the wire 27 to the target material 36 and to control the supply of flux 52 and wire 27 to the target material 36. Touching the wire 27 to the target material completes the electrical circuit between the target 36 and the power source/feeder 48, electricity from the power source/feeder 48 flows through the wire 27 and target material 36, producing an arc. The electric arc produces heat that melts the target material 36 in the region surrounding the point of contact between the wire 27 and the target material 36. The arc is submerged within the flux 52.

In the illustrated embodiment, the SMAW welding gun assembly 54 comprises a handle 38, a trigger 40, and an SMAW neck 54. The welding cable 56 also has an electrical cable (not shown) that electrically couples the trigger 40 to the power source/feeder 48. The trigger 40 enables a user to control the supply of flux 52, wire 27 and power from the power source/feeder 48. When the trigger 40 is operated, the power source/feeder 48 draws in wire 27 from the wire spool 26 and feeds it though the welding cable 56. Also, flux 52 flows from the reservoir 50 and SMAW welding cable 56 to the SMAW welding gun 54. The wire 27 and flux 52 are fed through the SMAW neck assembly 54 to the target material 36.

Figure 3:
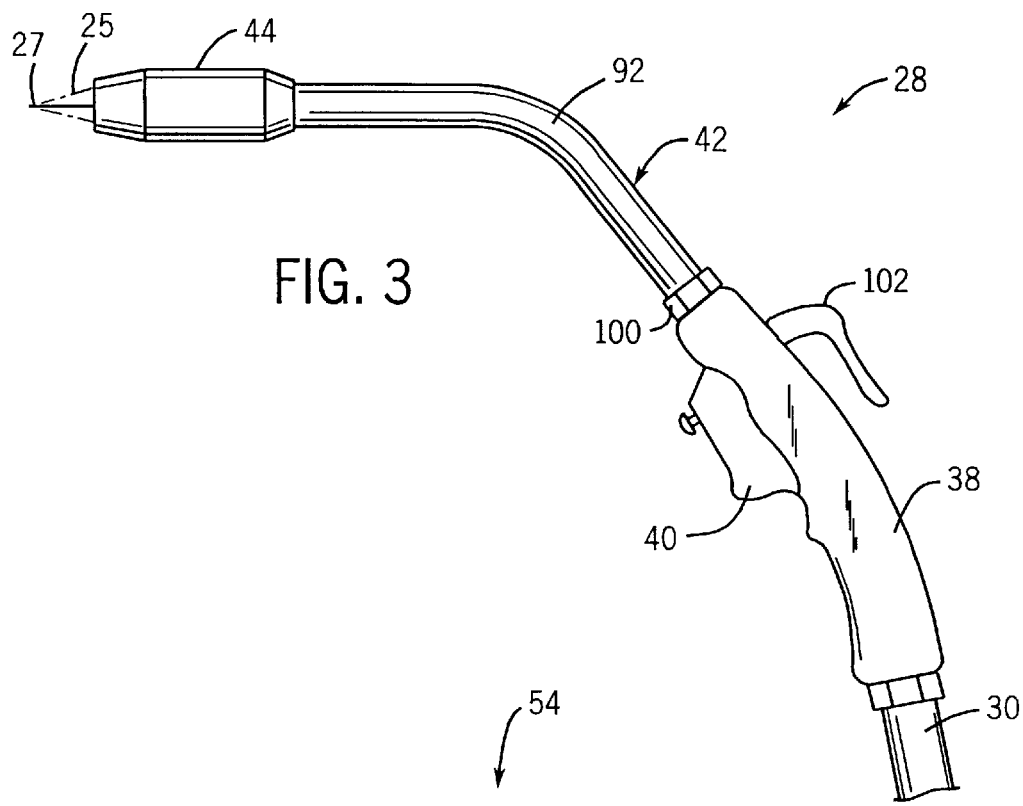
FIG. 3 is a front elevational view of a MIG welding gun, according to an exemplary embodiment of the present technique.
Figure 4:
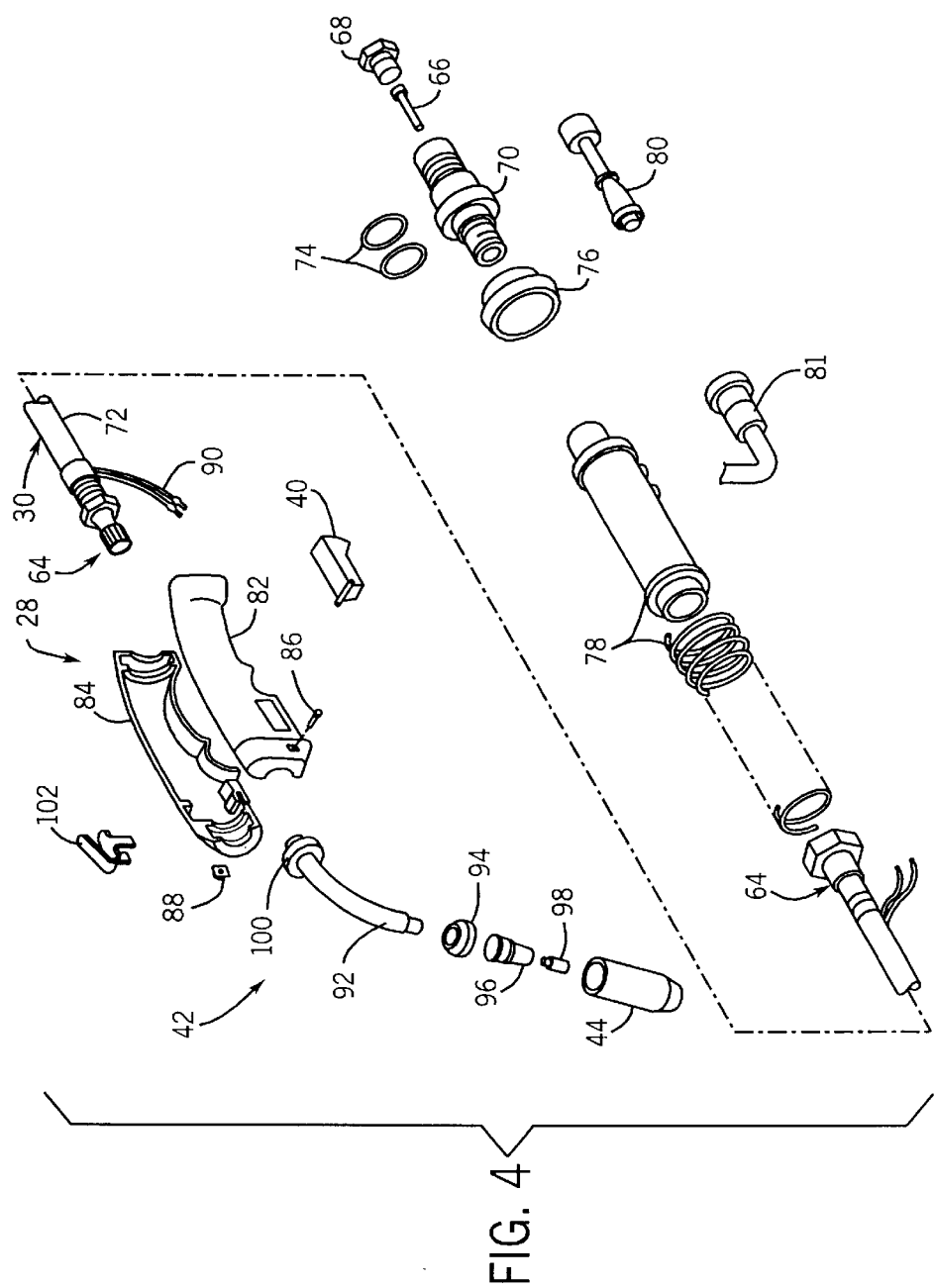
FIG. 4 is an exploded view of the MIG welding gun of FIG. 3.

Referring generally to FIGS. 3 and 4, the MIG welding gun 28 and MIG welding cable 30 are illustrated. In the illustrated embodiment, the MIG welding cable 30 has a connector assembly 64 that couples the MIG welding cable 30 to the MIG welding gun 28. Electrode wire 27 from the MIG welding cable 30 is fed into the connector assembly 64 through a liner 66. The liner 66 aligns the wire 27 (see FIG. 3) through the connector assembly 64. Gas 25 also flows through the interior of the MIG welding cable 30. A locking nut 68 is used to secure the liner 66 to an adaptor plug 70. The liner 66 may be replaced by disconnecting the locking nut 68 from the adaptor plug 70 to access the liner 66. The outer portion 72 of the welding cable 30 is inserted over a portion of adaptor plug 70. In the illustrated embodiment, O-rings 74 are used to maintain a seal between adaptor plug 70 and power source/feeder 22. A retaining nut 76 is used to secure a support housing and support spring assembly 78 to the plug adaptor 70. A trigger cable adaptor 80 and trigger/switch electrical cord 81 are used to electrically couple the trigger 40 to the MIG welding cable 30. In the illustrated embodiment, the welding handle 38 is comprised of a left handle portion 82 and a right handle portion 84. The left and right handle portions are secured to each other by a screw 86 and a nut 88. Additionally, electrical leads 90 are used to electrically couple the trigger 40 to the trigger/switch electrical cord 81. This enables the trigger to control the operation of the power source/feeder 22.

The MIG neck assembly 42 comprises a neck 92, an insulator 94, a diffuser 96, a tip 98, a retaining nut 100, and a nozzle 44. The tip 98 is used to direct the wire 27. The insulator 94 is used to prevent electricity in the wire 27 from flowing through the neck 92 to the welding handle 38. The diffuser 96 is used to establish the desired flow characteristics of the gas 25, e.g., pressure. The nozzle 44 is used to direct the gas 25 to the target 36.

In the illustrated embodiment, the cable connector assembly 64 is connected to the MIG neck assembly 42 to assemble the welding gun. The left and right handle portions then are secured together around the connection between the MIG neck assembly 42 and the cable connector assembly 64. The MIG neck assembly 42 is secured to the welding handle 28 by the retaining nut 100. Additionally, the MIG welding gun 28 may have a hook 102 that may be used to hang the MIG welding gun 28 from a mounting hook.

Figure 5:
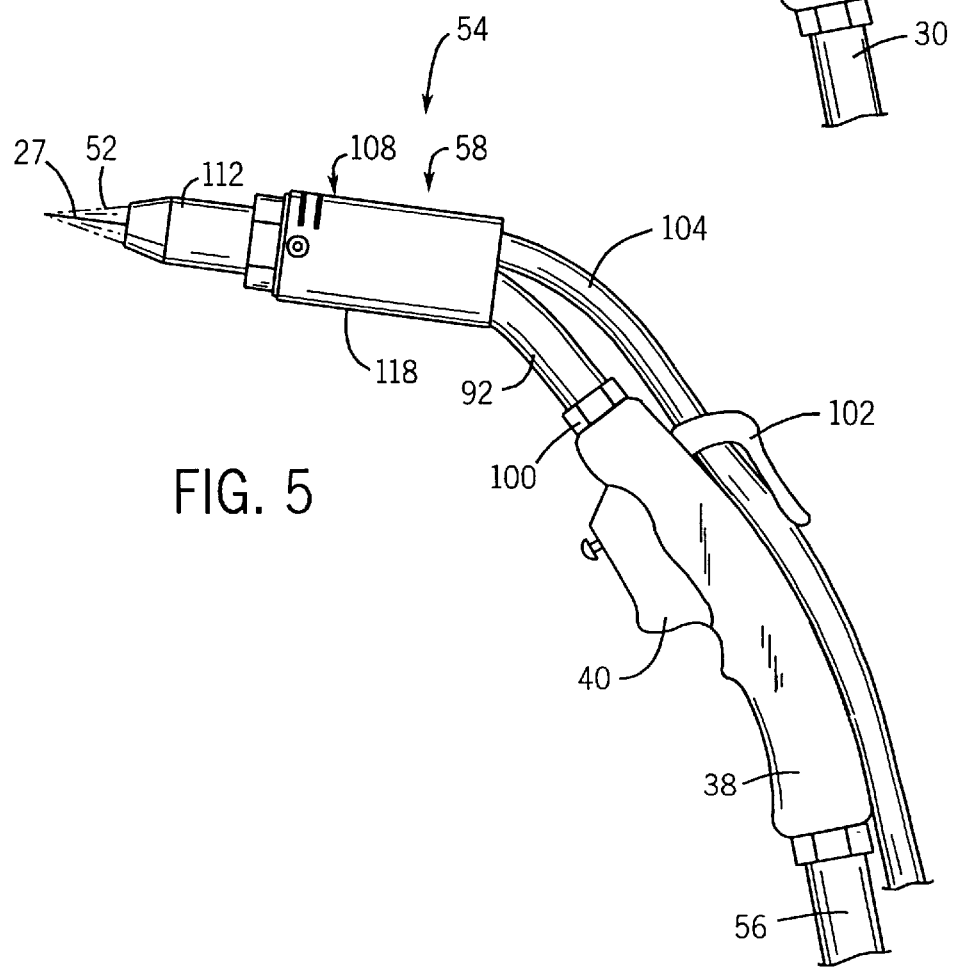
FIG. 5 is a front elevational view of a SMAW welding gun, according to an exemplary embodiment of the present technique.
Figure 6:
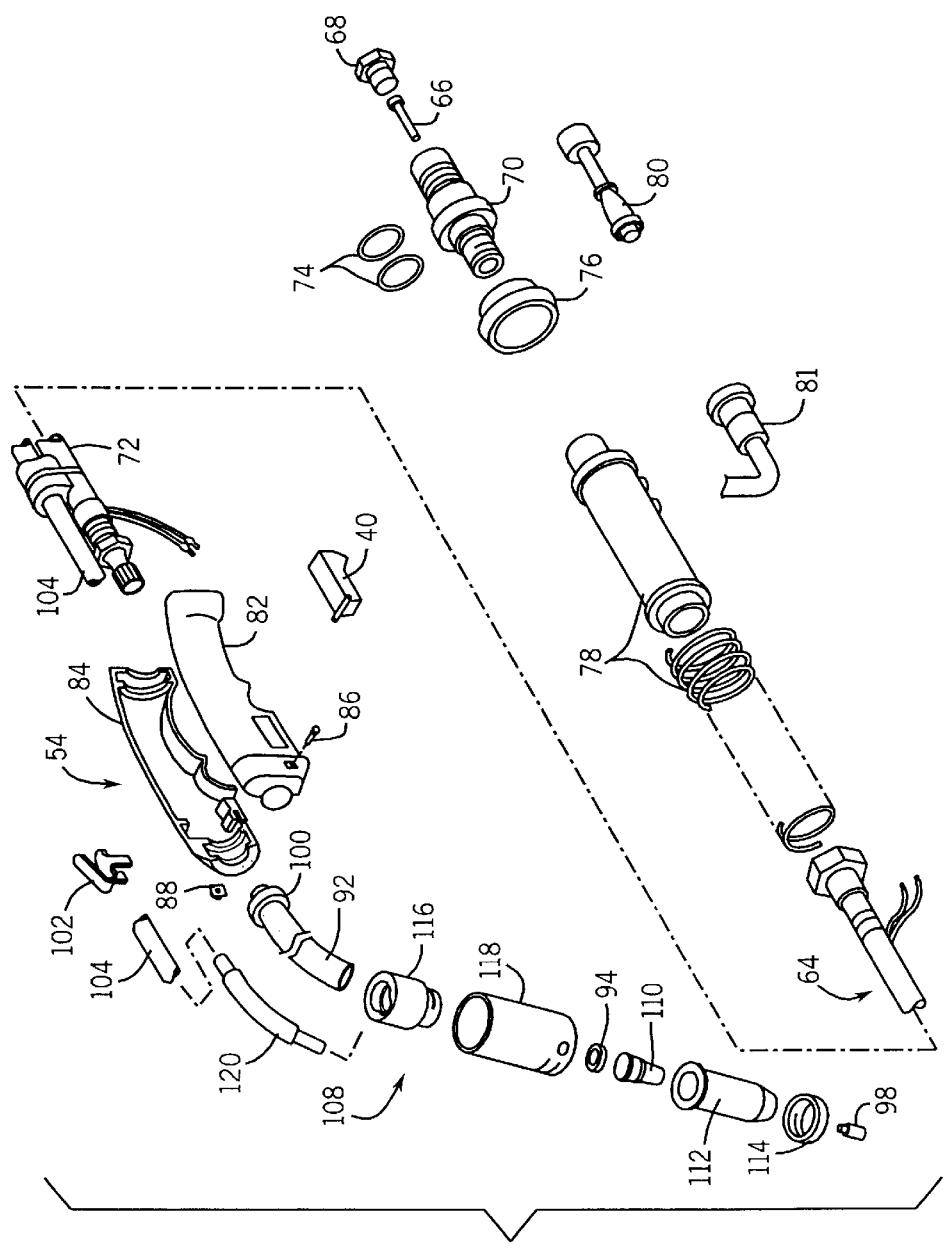
FIG. 6 is an exploded view of the SMAW welding gun of FIG. 5.

Referring generally to FIGS. 5 and 6, the SMAW welding gun 54 and SMAW welding cable 56 are illustrated. The SMAW cable has a flux hose 104 that channels flux 52 to a SMAW neck assembly 58. The SMAW neck assembly 58 comprises a neck 92, a flux distributor assembly 108, a flux diffuser 110, an insulator 94, a tip 98, a retaining nut 100, a nozzle 112, and a nozzle nut 114. As with the MIG system 20, the tip 98 is used to direct the wire 27 and the insulator 94 is used to prevent electricity in the wire 27 from flowing through the tip 98 to the welding handle 38. The flux diffuser 110 is used to establish the desired flow characteristics of the flux 52. The flux nozzle 112 is used to direct the flux 52 to the target 36. The neck 92 is used to couple the flux distributor assembly 108 to the welding handle 38. The SMAW neck assembly 58, including the neck 92 and flux distributor assembly 108, is secured to the welding handle 28 by the retaining nut 100. The SMAW welding gun 54 may have a hook 102 that may be used to hang the SMAW welding gun 54 from a mounting hook.

The flux distributor assembly 108 comprises a flux distributor 116 and a shell 118 surrounding the flux distributor 116. The flux distributor has a hose connector portion 120. The hose connector portion 120 is used to couple the flux hose 104 to the flux distributor 116. The flux distributor 116 also is coupled via the neck 92 to the welding handle 38. The flux distributor 116 receives a flow of wire 27 via the neck 92 and a flow of flux 52 via the flux hose 104. The wire 27 and flux 52 pass through the SMAW neck assembly 54, e.g. the flux diffuser 110 and the tip 98, to the target material 36.

Referring generally to FIG. 7, the tip 98 (of either the MIG or the SMAW arrangement) has a tip body 122 having a passage 124 extending through the tip body 122 through which wire 27 passes. The diameter of the passage 124 may vary for use with different diameter wire. The tip body 122 has a receiving portion 126 and an end portion 128. The receiving portion 126 is adapted to receive the wire 27 and guide it to the passage 124. The end portion 128 is adapted to be in facing relationship to the weld. The tip body 122 also has a threaded portion 130 that is adapted to secure the tip 98 to the welding gun. The tip body 122 may be composed of copper, a copper alloy, or other suitable material.

Referring generally to FIGS. 8–10, during manufacture, the tip body 122 undergoes an electroless nickel plating process. The tip body 122 is placed in a bat containing nickel. The nickel is chemically deposited on the surface of the tip body 122, including the passage 124 through the tip body 122, forming an electroless nickel layer 32. The electroless nickel layer 132 is a very hard and very smooth surf bee. The electroless nickel surface 132 significantly reduces irregularities from the surface of the passageway 124, reducing the friction between the wire and the sides of the passageway.

In the illustrated embodiment, the tip body 122 also is electroplated with a layer of nickel over the layer of chemically deposited electroless nickel 132. After the layer of electroless nickel 132 is applied, the tip body 122 is placed in a rotatable drum holding an electrolytic solution containing nickel ions. The container has a voltage applied to a portion of the drum. As the drum rotates, the outer surfaces of the tip body 122 periodically come into contact wit the charged portion of the drum, placing an electrostatic charge on the tip body. The nickel ions in the electrolytic solution are attracted by the charge on the tip body 122, forming a layer of electrolytic nickel 134 over the layer of electroless nickel 132 on the outer surfaces of the tip body 122, such as the end portion 128, but not the passage 124. The electrolytic nickel finish 134 is very smooth which will enable the tip to reject weld spatter that lands on the exterior portions of the tip 98, such as the end portion 128.

It will be understood that the foregoing description is of preferred exemplary embodiments of this invention, and that the invention is not limited to the specific forms shown. For example, the electroless nickel layer may extend over the entire surface area of the tip or over a smaller portion thereof. Additionally, the tip body may be plated with a layer of only electroless nickel or electrolytic nickel. These and other modifications may be made in the design and arrangement of the elements without departing from the scope of the invention as expressed in the appended claims.

What is claimed is:

1. A wire-feed arc welding system, comprising:
   an electrical power source;
   a wire feeder having a wire electrically coupleable to the electrical power source; and
   a welding gun adapted to receive the wire from the wire feeder, the welding gun having a tip to guide the wire, wherein the tip is plated with a plurality of distinct layers of nickel.

2. The system as recited in claim 1, wherein the tip comprises a passage therethrough, wherein the passage is plated with electroless nickel.

3. The system as recited in claim 1, wherein the tip comprises an end portion, wherein the end portion is plated with electrolytic nickel.

4. The system as recited in claim 1, wherein the tip comprises a first portion having a first outer surface layer of electroless nickel and a second outer surface layer of electrolytic nickel.

5. The system as recited in claim 1, wherein the tip comprises a copper body having a passageway therethrough.

6. The system as recited in claim 1, wherein the tip comprises a copper-alloy body having a passageway therethrough.

7. The system as recited in claim 1, wherein the welding system is a metal inert gas ("MIG") welding system.

8. The system as recited in claim 1, wherein the welding system is a submerged arc welding system.

9. A tip for guiding wire through a welding handle in a wire-feed welding system, comprising a first surface layer disposed over a first portion of the tip, the first surface layer comprising electrolytic nickel.

10. The tip as recited in claim 9, comprising a second surface layer disposed over a second portion of the tip, the second surface layer comprising electroless nickel.

11. The tip as recited in claim 10, wherein the first surface layer is disposed over a second surface layer of electroless nickel on the end portion.

12. The tip as recited in claim 9, comprising an end portion in facing relationship with a target material during welding, the first surface layer being disposed on the end portion.

13. The tip as recited in claim 7, comprising a passage having a guide surface to direct wire through the tip, the second portion of the tip including the guide surface, wherein the wire contacts a second surface layer of electroless nickel as it is directed through the tip.

14. The tip as recited in claim 9, wherein the tip comprises copper.

15. The tip as recited in claim 9, wherein the tip comprises a copper alloy.

16. A tip for a wire-feed welding system, comprising a first surface layer disposed over a first portion of the tip, the first surface layer comprising electroless nickel.

17. The tip as recited in claim 16, comprising a second surface layer disposed over a second portion of the tip, the second surface layer comprising electrolytic nickel.

18. The tip as recited in claim 17, comprising an end portion in facing relationship with a target material during welding, the second surface layer being disposed on the end portion.

19. The tip as recited in claim 16, wherein the second surface layer is disposed over a first surface layer of electroless nickel on the end portion.

20. The tip as recited in claim 16, comprising a passage having a guide surface to direct wire through the tip, the first portion of the tip including the guide surface, wherein the wire contacts the first surface layer of electroless nickel as it is directed through the tip.

21. A method for adapting a tip for use with a welding gun, comprising the act of:
applying a first layer of nickel plating to the tip using a first plating process; and
applying a second layer of nickel plating to the tip using a second plating process.

22. The method as recited in claim 21, wherein applying a first layer comprises applying a first layer of nickel to the tip using an electroless nickel plating process.

23. The method as recited in claim 22, wherein applying a second layer of nickel to the tip comprises applying a second layer of nickel using an electrolytic nickel plating process.

24. The method as recited in claim 22, further comprising the act of adapting the tip with a passage therethrough prior to applying the first layer of nickel plating, wherein the passage has an exterior surface layer comprising the first layer of nickel.

25. The method as recited in claim 21, wherein applying comprises applying a first layer of nickel to the tip using an electrolytic nickel plating process.

26. A method for adapting a tip for use with a welding gun, comprising the act of:
applying a first layer of nickel plating to the tip using an electroless nickel plating process.

27. The method as recited in claim 26, further comprising the act of subsequently applying a second layer of nickel to the tip in an electrolytic nickel plating process.

28. A method for adapting a tip for use with a welding gun, comprising the act of:
applying a layer of nickel plating to the tip using an electrolytic nickel plating process.

29. A method for adapting a tip for use with a welding gun, comprising the act of:
applying a first layer of nickel plating to the tip using an electroless nickel plating process; and
applying a second layer of nickel to the tip in an electrolytic nickel plating process.

30. A method for assembling a wire-feed welding gun, comprising the acts of:
adapting a tip to have a passageway extending through the tip;
applying a first layer of electroless nickel to the tip; and
assembling the welding gun with the tip.

31. The method as recited in claim 30, wherein the passageway has a first outermost surface layer comprising electroless nickel.

32. The method as recited in claim 30, comprising the act of subsequently applying a second layer of electrolytic nickel to the tip.

33. The method as recited in claim 32, wherein an end portion of the tip has a second outermost layer comprising electrolytic nickel.

34. A method for assembling a wire-feed welding gun, comprising the acts of:
applying a layer of electrolytic nickel to a tip of a welding gun; and
assembling the welding gun with the tip.

35. An arc welding system, comprising:
an electrical power source;
a wire feeder having a wire electrically coupled to the electrical power source; and
a welding handle having a tip to guide the wire toward a target material, wherein the tip has a first surface layer comprising nickel deposited in an electroless process and a second surface layer comprising nickel deposited in an electrolytic process.

36. The system as recited in claim 35, wherein the body comprises an inner passage extending therethrough to guide the wire through the tip, the first surface layer extending through the inner passage.

37. The system as recited in claim 35, wherein the second surface layer extends over a portion of the first surface layer.

38. A tip for a wire-feed arc welding system, comprising:
a first surface layer of nickel disposed on the tip using an electroless plating process; and
a second surface layer of nickel disposed over a portion of the first surface layer using an electrolytic plating process.

39. The tip as recited in claim 38, comprising an end portion in facing relationship with a target during welding, wherein the first and second surface layers are disposed on the end portion.

40. The tip as recited in claim 39, wherein the second surface layer is disposed exterior to the first surface layer on the end portion.

41. The tip as recited in claim 38, comprising a guide surface through the tip, the first surface layer comprising the guide surface through the tip.

42. The tip as recited in claim 38, wherein the first surface layer is disposed over a copper body.

43. The tip as recited in claim 38, wherein the first surface layer is disposed over a copper-alloy body.

* * * * *